Feb. 17, 1959  R. P. HAMMOND ET AL  2,874,106
HOMOGENEOUS NUCLEAR REACTOR
Filed April 11, 1955  2 Sheets-Sheet 1

WITNESSES
Ralph Carlisle Smith
R. Frederick Tiemann

INVENTORS
R. PHILIP HAMMOND
HAROLD M. BUSEY
BY
Roland A. Anderson
ATTORNEY

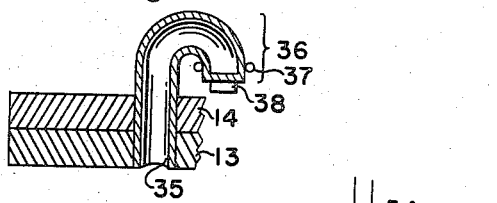
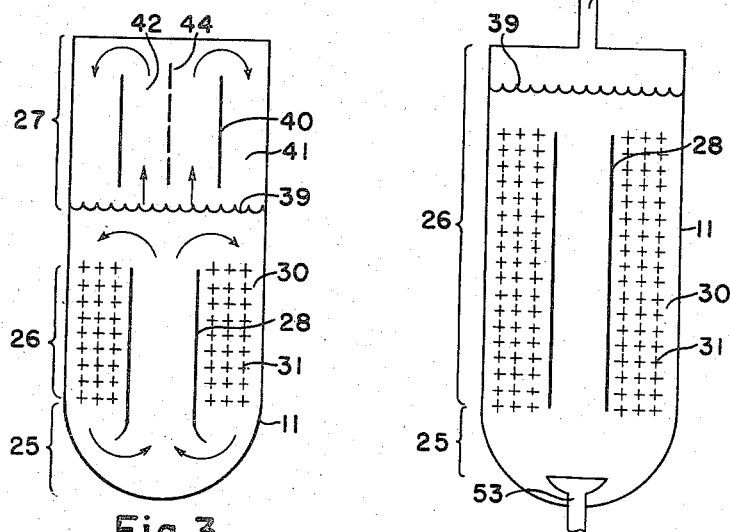
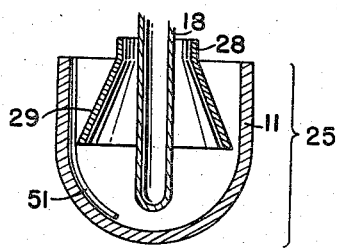

United States Patent Office 2,874,106
Patented Feb. 17, 1959

2,874,106

HOMOGENEOUS NUCLEAR REACTOR

R. Philip Hammond and Harold M. Busey, Los Alamos, N. Mex., assignors to the United States of America as represented by the United States Atomic Energy Commission Application April 11, 1955, Serial No. 500,710

4 Claims. (Cl. 204—193.2)

The present invention relates to nuclear reactors and more particularly to homogeneous nuclear reactors utilizing a liquid fuel.

The nuclear reactor of the present invention is an improved reactor of the homogeneous type, and is described as particularly suitable for use as a research device, where a sealed, maintenance-free reactor of moderately high neutron flux is desired.

Homogeneous reactors of the prior art generally require extensive fuel handling and gas recombining systems. The preferred embodiment of the present invention does not require fuel handling outside of the reactor vessel during normal operation, nor is the handling of radioactive explosive gas mixtures required. The reactors of the prior art also require extensive fuel circulating apparatus to circulate the liquid fuel through a heat exchanger, or are restricted to low power levels. No such restrictions are required in the present invention, since convection circulation of the liquid fuel is aided by the design of the system.

The present invention was designed in accordance with the following considerations: (a) a low construction cost for both the reactor per se, and the component equipment required for safe operation; (b) a reactor which would be relatively safe to operate and which would be simple in design; (c) a reactor primarily for use as a neutron source for research. These initial conditions imply a minimum of absorbing material in the critical region, high neutron reflection, a relatively small size, and a maximum utilization of self-regulation.

The use of homogeneous reactors for research facilities has well-known advantages. However, those presently in use exhibit increasing disadvantages at high power levels. The preferred embodiment of the present invention overcomes most of the disadvantages of high power-level operation, while preserving most of the advantages of this type of reactor.

Although the description of the preferred embodiment is specific to a power-level of about 100 kilowatts, at which the central neutron flux would be about $5 \times 10^{13}$ per square cm. per sec. using ordinary water as moderator, an appropriate scale-up of the reactor of the present invention could be operated in the megawatt region for power generation. The modifications required would include a larger critical region, heat exchanging capacity and volume of fuel, which would result in a lower fuel concentration.

The preferred embodiment of the present invention provides for the removal of heat from the critical region by a convection current system which moves the liquid fuel up a hot tube and returns it through a surrounding annulus containing layers of cooling coils. In the upper half of the vessel, above the liquid level, radiolytic hydrogen and oxygen are recombined in the presence of a catalyst. These gases are circulated over the catalyst by means of a convection current induced by the heat of recombination and by the condensation of steam.

In the present invention the liquid-gas interface is not in the critical region, i. e., not within the geometry which determines the critical mass. Therefore, disturbances on the liquid surface will have a reduced effect upon the power and neutron level. Further the arrangement of the liquid system of the present invention permits the maximum pumping effect by using bubbles formed in the liquid fuel to augment the thermal convection and heat removal. Since newly-formed bubbles are removed rapidly from the critical region along a definite path with a minimum time for coalescence, the fluctuations in the reactivity will be very small.

Therefore, the reactor can be primarily controlled by its negative temperature coefficient of reactivity, and the power level can be adjusted by regulating the flow of cooling fluid. For a steady neutron flux, a constant rate of flow of coolant will be required. However, conventional control rods may be used if desired. An advantage of control by the temperature coefficient is that the neutron flux distribution is similar at all power levels.

Changes in reactivity required by experimental samples or fuel burn-up can be made by three methods: (1) adjustment in the position of a neutron reflector; (2) addition or removal of fissionable material from the liquid fuel; (3) addition or removal of moderator from the liquid fuel. The first method is by far the simplest, but affects the neutron flux distribution. The second involves the hazard of handling contaminated liquid fuel. The third can be made quite simple for small temporary changes in reactivity. In the latter method, where a water moderator is used, by attaching a cold trap to the top plate, a portion of the water vapor in the reactor can be condensed and retained, thus concentrating the liquid fuel. This retained water may be added at any time to reduce the concentration of the liquid fuel.

Therefore, it is an object of the present invention to provide a homogeneous nuclear reactor which is relatively inexpensive to build, safe to operate, small in size, compact in arrangement, and which can be removed from its normal location without the danger of extensive residual radioactivity.

Another object of the present invention is to provide a homogeneous nuclear reactor which does not have the heat exchanger located within the critical geometry region but which has the heat exchanger within the same vessel as the critical geometry region.

A further object of the present invention is to provide a homogeneous nuclear reactor which has the critical geometry region, the liquid fuel heat exchanging apparatus and the gas recombiner located wholly within a single vessel.

A still further object of the present invention is to provide in a homogeneous reactor a method and apparatus for circulating, recombining and condensing radiolytically decomposed moderator gases and vapor, and for circulating the fuel solution through the heat exchanger apparatus without the use of moving parts within the reactor vessel.

A still further object of the present invention is to provide in a homogeneous reactor a method and apparatus for controlling the nuclear reactions taking place in a fissionable fuel solution, for removing heat from the fuel solution, and for recombining the dissociated moderator gases created by the fission reactions, within a single vessel.

Other objects and advantages of the present invention will become more apparent from the following description including the drawings, hereby made a part of the specification, wherein:

Figure 2 is a detailed sectional view of the critical region of the embodiment shown in Figure 1;

Figure 3 is a schematic diagram of the circulating systems;

Figure 4 shows a sectional view of the cold trap assembly, and,

Figure 5 is a schematic diagram of another embodiment of the present invention.

Apparatus

Figure 1:
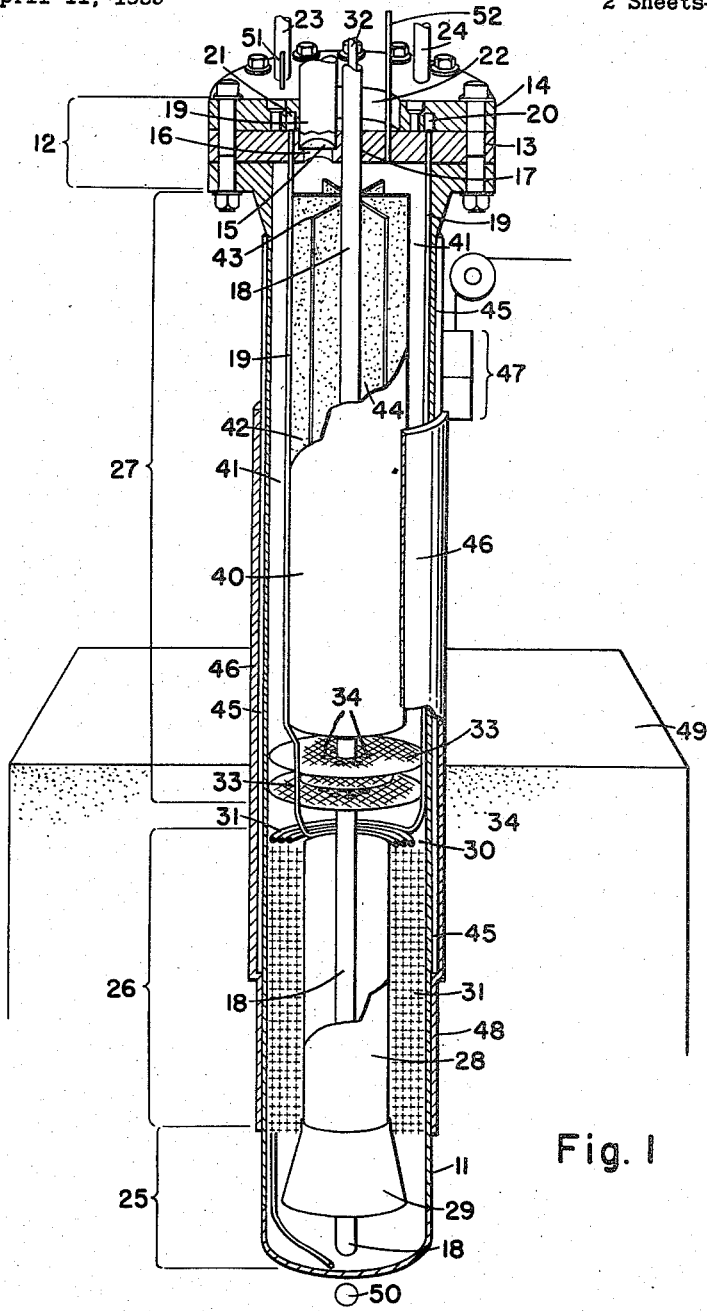
Figure 1 is a sectioned perspective of one embodiment of the present invention showing the internal components thereof.

The preferred embodiment of the present invention shown in Figure 1 comprises a test tube shaped reactor vessel 11, preferably fabricated from stainless steel, and a top plate assembly 12 sealed to the upper flanges of the vessel 11. The reactor is constructed in the form of a jacketed test tube, with all internal parts suspended from the top plate assembly 12, and with no joints or outlets in the vessel proper. The top plate assembly of the preferred embodiment indicated generally at 12 consists of a central plate 13 and manifold plate 14. The central plate 13 is sealed to the flange of the reactor vessel 11, and contains a rupture disk 15 in the opening 16, and a central aperture 17 for the closed sleeve 18. Appropriate inlet and outlet fluid coolant pipes 19 are sealed to the central plate 13 and pass through to coolant channels 20 and 21. The manifold plate 14 is sealed to the center plate 13 by means of bolts or other similar means, and contains a central aperture 22 for the passage of a closed sleeve 18, a coolant inlet 23 and coolant outlet 24 in its upper surface connected respectively to annular coolant inlet channel 20 and annular coolant outlet channel 21 in its bottom surface.

The interior chamber of the vessel 11 may be divided into three sections. The first section 25 is preferably located in the bottom portion of the vessel 11 and contains the critical geometry region, or zone of criticality. The second section 26 is located adjacent to but outside of the first region and contains the liquid fuel cooling apparatus. The third section 27, consisting of approximately the upper one-half of the pressure vessel, contains the gas recombiner apparatus and condensing means in the preferred embodiment.

The internal components of the preferred embodiment of the present invention include a chimney 28 located in the lower portion of the vessel 11, which has an outwardly flared lower portion 29 and which is spaced from the sides and bottom of the vessel 11. The flared portion 29 extends from the lower portion of the heat exchanger 31 to approximately the center line of the critical region, and aids in directing the convection currents in the liquid fuel as described hereinafter. The chimney 28 is preferably fabricated from stainless steel sheet having a thickness of about 0.01 inch. In this manner its effect upon critical dimension calculations is negligible. In the heat exchanging channel 30 between the outside of the chimney 28 and the interior of the vessel 11 is a heat exchanger 31. The heat exchanger, for the specific embodiment being described, consists of thirty-two flat coils of 3/16 inch OD, 1/8 inch ID, stainless steel tubing which are manifolded in flange 14, and are connected to annular coolant channels 20 and 21. The heat exchanger inlet and outlet pipes 19 are evenly distributed around the interior surface of the vessel 11, only two being shown for illustration purposes. The heat exchanger coils are spaced from each other, so that the liquid fuel can be circulated through the coil bank. These coils are distributed throughout the entire channel 30, exclusive of the area adjacent to the flared lower portion of the chimney 28.

The heat exchanger is supported by the outlet and inlet pipes 19 which are attached to the top plate assembly 12, so that the entire fuel cooling and convection apparatus may be removed with the top plate assembly.

Extending down from the top plate assembly 12 is a closed sleeve 18 into which a control rod 32 may be inserted, or which may be used as a sample irradiating tube. The sleeve 18 terminates slightly above the bottom of the reactor vessel 11. Sleeve 18 is sealed to the walls of the central apertures 17 and 22 in the assembly 12 by welding or other well-known means.

Above the upper end of chimney 28 is a series of fine mesh screens 33 for preventing splashing of the liquid fuel upwardly into the recombiner region and to act as an entrainment trap for droplets of fuel. The screens 33 are provided with holes 34 through which the gases from the liquid fuel pass to the recombining channel 41.

The level 39 (see Figure 3) of the liquid fuel is slightly above the upper extremity of the heat exchanger coils. Thus, each of the thirty-two heat exchanging coils of the preferred embodiment has eighty-one inches submerged in the liquid reactor fuel.

A fuel inlet pipe 51 is provided which is sealed to the top late assembly 12 and extends to the bottom of the reactor vessel 11. Through this inlet pipe, the liquid fuel is introduced into the reactor. The inlet pipe is connected through a control system (not shown) to a storage tank (not shown). Thus, the fuel may be removed from the reactor and stored at a remote, shielded location, if maintenance of the reactor components is required. Inlet pipe 51 also provides a means for adding fissionable material, moderator, or other material to the liquid fuel, as this may be required after operating the reactor for some time.

A vacuum pump inlet 52 is also provided. Inlet 52 connects the upper portion of the vessel 11, i. e., section 27, to a vacuum system (not shown). The purpose of this arrangement will become more apparent in the hereinafter described operation of the present invention.

The rupture disc 15 is preferably fabricated from stainless steel or platinum. The opening 16 is connected by a pipe to a shielded evacuated safety tank (not shown). Upon rupture of disc 15 by excess internal pressure the radioactive gases would be contained in the safety tank until decay or removal takes place. The rupture disc 15 and opening 16 are optional, and are included as an added safety measure.

The recombiner region 27 contains a vertically disposed chimney 40, shown as partially cut-away in Figure 1, which is spaced from the vessel 11, so that a passage or channel 41 is provided along the interior surface of the vessel 11. The interior of the chimney forms a second passage or channel 42.

Located inside the chimney 40 is at least one vertically disposed catalyst support 43, for example a coarse screen, to which the catalyst is attached. The gases liberated by the radiolytic dissociation of the water moderator are recombined by catalyst 44. The catalyst 44, preferably in the form of pellets, may be distributed over the support 43 in any desired manner. However, it has been found that faster convection circulation is obtained if more of the catalyst is placed near the bottom of the catalyst support 43, i. e., in the lower portion of chimney 40, since the convection rate is dependent upon the height of the hot gas column.

The preferred catalyst 44 consists of cylindrical platinized alumina pellets with dimensions of 3 mm. by 3 mm., and having 0.3 percent platinum by weight. The number of pellets required depends upon the amount of gas to be recombined. It has been found that one catalyst pellet is required to combine one milliliter of hydrogen per minute with oxygen at 20° C. start-up temperature. With 5000 pellets displaced on the catalyst support 43, and a flow of 5.0 liters of hydrogen per minute, the residual hydrogen is less than one percent. However, for safety purposes, the amount of catalyst should exceed the minimum requirements by a wide margin.

Approximately the upper two-thirds of the reactor vessel is enclosed within a water jacket 45, through which water or other cooling fluid is constantly circulating during normal operation. In this manner, the cold leg of the convection circuit, i. e., the condensing means, as well as the cold leg of the fuel convection current, is supplemented.

Outside of the water jacket 45 a sleeve 46 is located which may be divided into a series of independent segments. The sleeve 46 is made of cadmium, boron, or other neutron absorbing material. The sleeve 46 is movable parallel to the axis of vessel 11 by manual or automatic means (not shown), and is preferably supported by an electromagnet 47. In this manner the operation of the reactor can be controlled by merely de-energizing the electromagnets which will allow the curtain or sleeve 46 to fall to its bottom position thereby cutting off reflected neutrons. The lower portion 48 of sleeve 46 has a reduced diameter portion which extends downwardly from the lower end of water jacket 45 to approximately the lower portion of the heat exchanger 31, when the sleeve is in its upper position. The sleeve 46 may be lowered to a position where its bottom portion 48 encloses the reactor's critical region 25. In this manner, control of reflected neutrons is effected, so that the reactivity, and consequently the operating temperatures, can be controlled in a simple yet positive manner.

Surrounding the entire lower portion of the vessel 11 is a neutron reflector 49 such as graphite, beryllium, or liquid neutron reflecting materials. The reflector 49 is symmetrically disposed relative to the critical region 25, and is preferably of such thickness as to provide at least two feet of reflector in any direction from the center of the critical region. One or more sample ports 50 may be provided in the reflector adjacent to the critical region 25.

The shielding and thermal column construction and design are not described herein. The article entitled, "An Enriched Homogeneous Nuclear Reactor," in The Review of Scientific Instruments, volume 22, No. 7, pages 489–499, July 1951, together with AECD-3287 (Technical Information Service, Oak Ridge, Tennessee, 1952), which are incorporated herein by reference, describe such structures in detail.

Critical region and fuels

The determination of the size of the critical region or zone of criticality is dependent upon the following parameters:

1. Type of fuel
2. Type of moderator
3. Reflector material and thickness
4. Fuel-moderator ratio
5. Configuration of the critical region
6. Presence of neutron absorbing materials
7. Desired operating temperature Various liquid fuels, such as, for example, solutions or slurries, may be used in the reactor of the present invention. These include, but are not limited to, enriched uranyl nitrate and uranyl sulphate solutions in ordinary or heavy water, as well as liquid fuels including plutonium as the fissionable material. Only one specific example will be given, although no limitation is thereby intended.

A solution of enriched uranyl sulfate ($UO_2SO_4$) in ordinary water having, for example, of the order of 0.5 molar solution, is the preferred fuel concentration for the research reactor of the present invention. This type of liquid fuel has been used in a homogeneous reactor in the past, and many of its characteristics are known (See Review of Scientific Instruments, supra).

The fissionable component of the preferred fuel is uranium enriched in the isotope $U^{235}$ to a value of about 90 percent. The reflector material is preferably graphite, because of its lower cost.

The configuration of the critical region is, as a close approximation, one-half cylindrical and one-half spherical. Thus, the critical size is determined by extrapolation between the critical size for a sphere and the critical size for a cylinder. Each of these calculations, as well as the extrapolation, are well known in the art. Such calculations are performed in accordance with the generally accepted theory as described in Glasstone & Edlund, The Elements of Nuclear Reactor Theory, Chapter VIII (Van Nostrand Company, 1952).

By this analysis the approximate quantities and proportions for the preferred liquid fuel are as follows:

| | |
|---|---|
| Uranium | 90 percent $U^{235}$. |
| Critical mass | 900 gm. $U^{235}$. |
| Operating mass | 2 kg. $U^{235}$. |
| Dimensions of the critical region | One-half spherical with 4 inch radius; plus a cylinder 4 inches high with a 4 inch radius |
| Moderator | Normal water, 14 liters. |
| Reflector | Graphite, 60 inch cube. |

Utilizing this fuel solution the power output would be approximately 100 kw. with a maximum thermal flux of the order of $10^{13}$ neutrons/sq. cm./sec.

Should heavy water be utilized as the moderator, the dimensions of the critical region would have to be increased accordingly, and this would about double the thermal neutron flux at a given power level. In this case the upper portion of the reactor vessel could be unchanged, but the bottom portion, i. e., 25, would be increased to approximately fourteen inches in diameter. The quantity of $U^{235}$ required would be considerably reduced, to approximately one-half. It should be noted that the term "water" as used herein, unless otherwise specifically indicated, includes both normal water and heavy water, and that enrichments of $U^{235}$ other than 90 percent are specifically contemplated. Further, liquid moderators other than water, for example, fused salts, organic liquids, or liquid metals, are specifically contemplated. The term "fissionable material," as used herein, means material which readily undergoes fission when bombarded by thermal neutrons, i. e., $U^{233}$, $U^{235}$, or $Pu^{239}$. It should also be noted that the quantities and proportions pointed out above are only approximate, and that the calculation of the exact quantities and proportions depends upon flux desired, the desired operation power level, the size of the reactor, the amount of effective poisoning components in the solution, and the moderator and reflector utilized. Although in the embodiments described a neutron reflector is utilized, the reactor will function without such reflection if it is made large.

Thus it is apparent that the exact physical meaning of "critical region" or zone of criticality will depend upon the factors noted at the beginning of this section. However, in any case these terms necessarily imply a fuel-moderator concentration in a critical geometry sufficient to sustain a fission chain reaction, i. e., the effective neutron multiplication factor is at least unity.

Start up operation

In starting up the reactor of the present invention, first one-half of the sleeve segments 46 are raised. The control rod 32 may be utilized during start-up and removed for normal operation thereby leaving sleeve 18 free for experimental use.

The vessel 11 is then evacuated through vacuum pipe 52 by a vacuum system not shown. The reactor of the present invention is preferably operated with practically all air removed. Although this is not essential to operability, it has certain advantages as noted hereinafter. In this manner, while the reactor is in operation, the vessel will normally be below atmospheric pressure and any leak would be inward, thereby reducing the hazard of radioactive gases escaping from the vessel. Further, the absence of air will increase the efficiency of the condensing surfaces, and the high water vapor content will decrease the possibility of explosions of the oxygen-hydrogen mixtures.

The liquid fuel is then introduced through inlet pipe 51. As the fuel solution is introduced, various tests and calibrations will be made in accordance with standard procedures. After the level of the fuel has been raised to the normal operating level, i. e., so that the heat exchanger 31 is completely immersed in the fuel, the input of fuel is stopped.

As the remainder of the sleeve segments 46 are raised, the neutrons reflected back into the critical region by the reflector 49 will cause the fissionable fuel to become at least critical, i. e., the effective neutron multiplication will be at least one. Thus, the liquid fuel will heat, since the fission process will create heat. As the reactor begins to heat the fissionable liquid fuel will expand, so that its reactivity is reduced. The effect is to maintain such a temperature that the multiplication rate is always very nearly one. The fissionable fuel concentration should be adjusted so that the fully withdrawn position of the sleeve 46 represents the desired maximum operating temperature, such as, for example, 90° C.

Water is then introduced into heat exchanger 31 and cooling jacket 45. The effect of the water in the heat exchanger is to increase the power output, since the reactivity will be maintained at the same value. Thus, it can be seen that the power level of the reactor is controlled by the amount of heat removed through the heat exchanger, i. e., the rate of water flow which may be varied. The water in the heat exchanger is preferably ordinary filtered city water (not refrigerated) and preferably flows through coolant inlet and outlet pipes 23 and 24 under ordinary city water pressure. The induced radioactivity in the water, if it is of sufficient purity, will be negligible and the water can be discarded after a few minutes delay.

*Fuel circulation*

The heat which is created in the critical region or zone of criticality 25 will create a convection current within the liquid fuel. The greatest portion of this heat will be created in the center of the zone of criticality, since the neutron utilization is greatest here, i. e., leakage is at a relative minimum. Thus, the convection currents will be a relative maximum in this area. Also, hydrogen and oxygen produced by radiolysis form as microscopic bubbles distributed throughout the critical volume. In the preferred embodiment this central area is located immediately below the chimney 28. Therefore, as the liquid fuel heats up, a convection current will be created which will cause the hot liquid fuel to flow up the chimney 28. This flow is aided by the flared portion 29. The convection circulation of the liquid fuel will also be aided by the fact that the bubbles formed in the critical region will move up the chimney 28 due to their buoyancy. In this manner the fuel will circulate solely by convection current to the top of chimney 28. The denser fuel solution present in the cooling channel 30, i. e., the region of the heat exchanger 31, will flow downwardly into the critical region and be heated by the reaction taking place. Therefore, it can be seen that the hot leg of the convection current flows up the chimney 28, and that this liquid fuel then flows through the heat exchanger 31 where it is cooled thereby creating the cold leg of the convection circulating system.

This arrangement is preferred because the long convection legs will cause rapid circulation without the necessity of a complicated mechanical circulating system. Furthermore, by this arrangement the power level will be unperturbed by ripples on the liquid surface or by bubble formation. This can be seen by considering the fact that the surface of the liquid fuel is removed from the critical region by approximately 18 inches in the preferred embodiment. Furthermore, the bubbles which are formed are swept from the critical region by the convection circulation before coalescence to larger bubbles has become appreciable, and therefore will have little or no effect upon the reactivity in the critical region.

Thus, by this arrangement the complicated control rod mechanisms which are required in prior art devices (see The Review of Scientific Instruments, supra, page 496) in order to maintain accurate control of the neutron level, are not required in the present invention.

*Gas circulation*

The gases liberated by the radiolytic dissociation of the water moderator and the moderator vapor move into the area immediately above the solution surface. Baffles 33 function to prevent any liquid fuel from splashing or otherwise reaching the recombiner apparatus. The dissociated gases and vapor flow into the chimney 40 and channel 42 where they pass over the catalyst 44. The catalyst 44 functions to recombine the hydrogen and oxygen gases to form water. During this recombination, heat is liberated, whereby the gases are caused to flow up the channel 42. The recombined gases and vapor flow over the top of chimney 40 into the cooling and condensing channel 41. The cooling action of the water jacket 45 and the inlet pipes 19 condense the water vapor which is directed back into the fuel solution by baffles 33. Non-condensed gases pass into the hot leg and continue about the convection circuit.

The recombiner unit operation is more specifically described in co-pending application S. N.–493,579 filed March 10, 1955, by Harold M. Busey, entitled, Apparatus for Catalytically Combining Gases, now Patent No. 2,847,284, issued August 12, 1958, the disclosure of which is incorporated herein by reference. By this method the dissociated moderator gases are circulated over the recombining catalyst and are condensed in channel 41 without the use of circulating machinery. Furthermore, this arrangement makes it possible to place the recombining unit within the same vessel as the critical region thereby dispensing with burdensome and hazardous handling of explosive radioactive gases. The fact that the recombination takes place proximate to the liquid fuel means that the shielding of the reactor also functions as a shield for the gas recombiner. Prior art devices of this type usually require not only extensive venting apparatus or complicated associated recombining apparatus located remotely from the critical region, but also additional shielding. The preferred embodiment of the present invention dispenses with both of these complicated and costly requirements.

*Control*

The temperature of the liquid fuel can be accurately controlled by the proper positioning of the sleeve 46 or the adjustment of the fissionable material content of the liquid fuel. The available reactivity may also be controlled by using a control rod 32 in the closed sleeve 18, if desired. However, the utilization of a control rod in this position will increase the fuel requirements, and is not required. The negative temperature coefficient of reactivity plus the absence of perturbations within the critical region will result in good neutron flux stability in all but the most exacting cases.

Another method of controlling the reactivity of the preferred embodiment of the present invention is by the addition or removal of water from the solution. This can be accomplished by the apparatus shown in Figure 4. A closed end pipe 35 with its interior cavity communicating with the vapor region 27 of the reactor, and having downwardly extending vapor trap portion 36, is sealed to the top plate assembly 12. The portion 36 of the pipe 35 is surrounded by a cooling coil 37 and has heated 38 adjacent to its closed end. In this manner water may be removed from the reactor solution by cooling the portion 36 thereby condensing the water vapor which will be present because of the connection between portion 36 and region 27. When it is desirable to return this water to the reactor solution, the cooling apparatus 37 is turned off and the heater 38 is turned on, so that water present in portion 36 will be vaporized and driven back into the recombiner region. The cooling coils 37, heater 38 and associated apparatus may be of any conventional type. Additional water may be added through inlet pipe 51, if required.

One embodiment of the present invention which is specifically contemplated is one in which there is no recombination of gases within the reactor vessel. In this embodiment the heat exchanger is located within the same pressure vessel as the critical reaction region, but is not within the critical geometry, i. e., in the same manner as the preferred embodiment. However, the gas recombining apparatus or gas venting apparatus would be in accordance with the teachings of the prior art, i. e., located external to the reactor vessel. Furthermore, in such an embodiment mechanical forced circulation means may be included, if reliance solely upon convection circulation is not desired. Such an embodiment would, however, have the disadvantages of moving parts within the reactor vessel and hazardous handling of radioactive explosive gases. Figure 5 shows such an embodiment, where 11 is the reactor vessel, 25 the critical region or zone of criticality, 28 the chimney, 31 the heat exchanger, 53 is a forced circulation impellor, and 54 is a vent for the radiolytically-dissociated moderator gases and vapors. This embodiment is the same as that shown in Figure 1 except that the recombining region 27 has been removed and a vent 54 and impellor 53 have been added. Means well known in the art would be utilized to seal the driving shaft of impellor 53 to the vessel 11, as well as to rotate the impellor. The fuels of such an embodiment would be the same as those mentioned for the preferred embodiment.

The combination of this invention of the recombining means and a nuclear reactor within the same pressure vessel does not require that the critical region and heat exchanger be of the preferred type disclosed herein. Thus, the recombining means may be used with a conventional reactor of the "water boiler" type. This embodiment would require a larger reactor vessel than the conventional water boiler, so that appropriate space is available therein for the recombining means. Furthermore, forced circulating means may be utilized to circulate the vapor and gases through the recombining means, if reliance on convection circulation is not desired. The disadvantages of having moving parts within the reactor vessel would also be present in such an embodiment.

Thus, it is apparent that the preferred embodiment of the present invention provides a system which operates with two convection currents. One convection current moves the heated liquid fuel from the critical region through the heat extraction coils. A second current, powered by hydrogen and oxygen recombination, circulates the gas past a catalyst and through a condensing region. Figure 3 is a schematic diagram showing the manner in which circulation by convection currents is performed, and the components indicated in Figure 3 are the same as Figure 1. By this arrangement of components means are provided for circulating the gases and the fuel without using any moving parts within the reactor vessel.

Further, it can be seen that the reactor of the present invention has a reduced critical region dimension, since the heat exchanger has been removed from this region thereby eliminating neutron absorption in this area by the heat exchanger. This location also reduces the radioactivity of the coolant, because the coolant is not located in the highest flux region. As a result the coolant requires less safety precautions because of the lower induced radioactivity and the resulting shorter decay period to tolerable levels.

The removal of the liquid-gas interface from the critical region stabilizes the neutron level, since surface perturbations do not change the reactivity in the critical region.

It is also apparent that the reactor of the present invention may be easily removed from its operating location, since all connections are made at the top of the vessel thereby facilitating disconnection. Furthermore, all internal components are suspended from the top plate assembly so that removal for replacement or repair may be easily accomplished.

The preferred embodiment of the present invention utilizing a liquid fuel of uranyl sulfate and normal water, does not require extensive corrosion protection of the reactor vessel or component parts. However, such corrosion protection in the form of gold, silver, platinum or similar material may be required for fuels other than the preferred liquid fuel.

It is, therefore, apparent that the present invention provides a novel arrangement and association of parts which results in a nuclear reactor having numerous advantages over prior art devices. While presently preferred embodiments of the invention have been described, it is clear that many other modifications may be made without departing from the scope of the invention. Therefore, the present invention is not limited by the foregoing description, but solely by the appended claims.

What is claimed is:

1. A homogeneous nuclear reactor comprising a closed vessel containing a volume of liquid fuel including a fissionable material and a water moderator, said fissionable material being selected from the group consisting of uranium and plutonium, means for attaining nuclear criticality in a zone of criticality in said liquid fuel, said zone of criticality being located in the bottom of said vessel, heat exchanger means for removing heat from said liquid fuel, said heat exchanger means being located within said liquid fuel above said zone of criticality, means for recombining radiolytically-dissociated moderator gases, said recombining means including a catalyst, means for condensing moderator vapor, said recombining means and said vapor condensing means being located above said heat exchanger means and said liquid fuel, means for circulating said dissociated moderator gases and vapor over said catalyst and through said condensing means, and means for circulating said fuel through said heat exchanger means and said zone of criticality.

2. A homogeneous nuclear reactor comprising a closed vessel containing a volume of liquid fuel including a fissionable material and a water moderator, said fissionable material being selected from the group consisting of uranium and plutonium, means for attaining nuclear criticality in a zone of criticality in said liquid fuel, said zone of criticality being located in the bottom of said vessel, a centrally located chimney extending upward from said zone of criticality, heat exchanger means disposed between said chimney and the wall of said vessel, said heat exchanger means being located above said zone of criticality, said quantity of liquid nuclear fuel being sufficient to cover said chimney and said heat exchanger means, means for recombining radioltyically-dissociated gases, means for condensing moderator vapor, said recombining means and said vapor condensing means being located above the level of said liquid fuel, means for circulating said dissociated moderator gases and vapor through said recombining means and said vapor condensing means, and means for circulating said liquid fuel up said chimney, down through said heat exchanger means and back to said zone of criticality.

3. A homogeneous nuclear reactor comprising a closed vessel containing a quantity of liquid fuel including a fissionable material and a liquid moderator, said fissionable material being selected from the group consisting of uranium and plutonium, means for attaining nuclear criticality in a zone of criticality in said liquid fuel, said zone of criticality being located in the bottom of said vessel, a vetically disposed centrally located chimnel, heat exchanger means disposed between said chimney and the wall of said vessel, said chimney and said heat exchanger means being located within said liquid fuel above said zone of criticality, and means for circulating said liquid fuel through said heat exchanger, said chimney and said zone of criticality.

4. A homogeneous nuclear reactor comprising a sealed evacuated vessel containing a quantity of liquid fissionable fuel including enriched uranium and a water moderator, means for attaining nuclear criticality in a zone of criticality in said fissionable liquid fuel, said means including neutron reflecting material for reflecting at least a portion of the neutrons liberated in said zone of criticality back into said zone, said zone of criticality being located in the bottom of said vessel, heat exchanger means in said liquid fuel for removing heat from said liquid fuel, said heat exchanger means being located above said zone of criticality, means for recombining radiolytically-dissociated moderator gases, means for condensing moderator vapors, said recombining means and condensing means being located above said heat exchanger means, said quantity of liquid fissionable fuel having a level between said heat exchanger means and said recombining means and condensing means, means for circulating said dissociated moderator gases and vapors through said recombining means and condensing means, means for circulating said liquid fuel through said heat exchanger means and said zone of criticality, and means for controlling the portion of reflected neutrons.

References Cited in the file of this patent

Beck et al.: U. S. Atomic Energy Commission ORO-33, July 5, 1950, pp. 16-47, 68.
Bunker et al.: LA-1337, p. 23, Mar. 6, 1952.
Chalker Science, Jan. 1, 1954, pp. 9-14.
Beall et al.: Chemical & Engineering Progress, vol. 50, No. 5, pp. 256-62, May 1954.